(12) United States Patent
Egan et al.

(10) Patent No.: US 8,308,830 B2
(45) Date of Patent: *Nov. 13, 2012

(54) COATED CBN

(76) Inventors: David Patrick Egan, County Clare (IE); Kieran Greene, County Clare (IE)

( * ) Notice: Subject to any disclaimer, the term of this patent is extended or adjusted under 35 U.S.C. 154(b) by 145 days.

This patent is subject to a terminal disclaimer.

(21) Appl. No.: 12/599,202

(22) PCT Filed: May 22, 2008

(86) PCT No.: PCT/IB2008/052018
§ 371 (c)(1), (2), (4) Date: Apr. 22, 2010

(87) PCT Pub. No.: WO2008/142656
PCT Pub. Date: Nov. 27, 2008

(65) Prior Publication Data
US 2010/0213247 A1    Aug. 26, 2010

(30) Foreign Application Priority Data
May 22, 2007   (ZA) .................................. 2007/04166

(51) Int. Cl.
B24D 11/00 (2006.01)
B24D 3/02 (2006.01)
C09C 1/68 (2006.01)
C09K 3/14 (2006.01)

(52) U.S. Cl. ............................ 51/307; 51/297; 51/309

(58) Field of Classification Search ............... 51/307, 51/297, 309
See application file for complete search history.

(56) References Cited

U.S. PATENT DOCUMENTS

| | | | |
|---|---|---|---|
| 4,117,968 A * | 10/1978 | Naidich et al. | 228/124.1 |
| 4,228,942 A | 10/1980 | Dietrich | |
| 4,403,001 A * | 9/1983 | Grenier | 427/217 |
| 4,605,343 A | 8/1986 | Hibbs, Jr. et al. | |
| 4,776,862 A * | 10/1988 | Wiand | 51/293 |
| 5,306,318 A * | 4/1994 | Carius et al. | 51/293 |
| 5,330,937 A * | 7/1994 | Ellison-Hayashi et al. | 501/1 |
| 5,389,118 A | 2/1995 | Hinterman et al. | |
| 5,456,735 A * | 10/1995 | Ellison-Hayashi et al. | 51/307 |
| 5,500,248 A * | 3/1996 | Iacovangelo et al. | 427/250 |
| 5,529,805 A | 6/1996 | Iacovangelo et al. | |
| 5,626,909 A | 5/1997 | Iacovangelo | |
| 5,647,878 A * | 7/1997 | Iacovangelo et al. | 51/295 |

FOREIGN PATENT DOCUMENTS

| | | |
|---|---|---|
| DE | 27 50 436 | 5/1979 |
| DE | 27 50436 A | 5/1979 |
| EP | 0 220 964 A | 5/1987 |
| EP | 0 467 404 A | 1/1992 |
| EP | 0 480 878 A | 4/1992 |
| EP | 0 716 159 A | 6/1996 |
| GB | 1162390 | 8/1969 |
| JP | 07-034063 | 2/1995 |
| WO | WO 2004/028746 A | 4/2004 |
| WO | WO 2004/029310 A | 4/2004 |
| WO | WO 2005/078041 A | 8/2005 |
| WO | WO 2005/078044 A | 8/2005 |
| WO | WO 2008/142656 A | 11/2008 |
| ZA | 82/3067 | 5/1982 |

* cited by examiner

Primary Examiner — James McDonough
(74) Attorney, Agent, or Firm — Frommer Lawrence & Haug LLP; Ronald R. Santucci

(57) ABSTRACT

The invention relates to a coated boron or nitrogen containing superhard abrasive material selected from cBN, boron suboxide and boron carbide comprising: cBN, boron suboxide and/or boron carbide superhard abrasive material substrate; a primary layer of a carbide/nitride/boride forming metal, such metal preferably being Ti and preferably being substantially in the form of the carbide, nitride or boride; a secondary layer of a high melting point metal selected from W, Mo, Cr, Ni, Ta, Au, Pt, Pd and alloys thereof; and an overcoat of Ag, Ni, Cu, Au, Pd, Pt, Rh, Os, Ir, Re, combinations and alloys thereof such as bronze (Cu/Sn), silver/bronze and silver/tin, the metal of the secondary layer being different to the metal of the overcoat. The invention further relates to methods for the manufacture of such material, use of such materials in tools and tools including such material.

17 Claims, No Drawings

COATED CBN

INTRODUCTION

This application is a 371 of PCT/IB2008/052018 filed on May 22, 2008, published on Nov. 27, 2008 under publication number WO 2008/142656 A and claims priority benefits of South African Patent Application No. 2007/04166 filed May 22, 2007, the disclosure of which is incorporated herein by reference.

This invention relates to coated boron or nitrogen containing superhard abrasive material, a process for the production of such material and to coated boron or nitrogen containing superhard abrasive material containing tools. In particular, this invention relates to coated cBN, boron suboxide and/or boron carbide superhard abrasive material and the use of such material in an oxidative environment. cBN abrasive material includes stoichiometric cBN grit, non-stoichiometric cBN grit, oxygen rich cBN grit, Polycrystalline Boron Nitride (PCBN) blanks, cBN compacts and agglomerates of cBN.

BACKGROUND OF THE INVENTION

Superabrasives such as diamond and cBN are commonly used in cutting, grinding, drilling, sawing and polishing applications. One of the methods to produce tools containing cBN for the above applications is brazing. However, in brazing processes, it is difficult to achieve adequate bonding between the cBN and the braze material due to the presence of boric oxide layer on the surface of the cBN which hinders the braze material wetting the surface of the cBN when the braze is melted. This lack of wetting typically results in poor adhesion of the cBN in the braze. In addition, the boric oxide layer is poorly chemically bonded to the cBN which means the interfacial bonding between the boric oxide layer and the cBN is poor. In the tool making industry both these factors has limited the uptake of cBN.

Coatings have been applied to superabrasives in order to improve the performance of superabrasive impregnated metal matrix tools. WO2005078041 (Egan et al., E6, 2005) describes a coating with a primary layer of TiN and a secondary layer of W on cBN in grit sizes from 0.1 um to 10 mm. The TiN and W combination of coatings is useful where the TiN coating would be reacted away by a constituent of the matrix material during sintering. For example, the TiN and W combination is useful where the titanium based coating would be reacted away by liquid phases used to fix a superabrasive component to another metallic or ceramic material.

However, a problem with WO2005078041 (Egan et al., E6, 2005) and other coatings on cBN is that the production of tools a non oxidizing environment is required in order to prevent damage to the coating. The oxidation of the coating surface in an oxidising environment can affect the retention of the coating in the matrix. In addition, any protection offered by the coating may be compromised. Both these occurrences restrict the benefits offered by coatings when brazing in an oxidising environment.

Therefore, brazing is normally undertaken under vacuum with inert gases and very specific brazes, all of which make the brazing process relatively difficult and expensive. Therefore, having a cBN product which could be brazed in air (an oxidizing environment) using relatively inexpensive standard brazes would simplify the brazing process and reduce costs.

In U.S. Pat. No. 5,647,878 (Iacovangelo et al., GE, 1997) and U.S. Pat. No. 5,500,248 (Iacovangelo et al., GE, 1996), the authors describe overcoming the above problems on Chemical Vapour Deposition (CVD) diamond inserts by applying a dual layer coating consisting of a WTi bonding layer and a protective braze compatible overcoat such as Ag. It is shown that the dual-coated diamond insert may be air brazed to a tool substrate in a manufacturing environment using a standard braze without a vacuum furnace or special atmosphere.

In both '878 and '248, the invention is aimed at diamond tool inserts. The substrate mentioned is primarily concentrated on CVD diamond, and all examples use CVD diamond.

EP 0 716 159 describes a CBN compact which is coated with a coating of an inner layer of WTi and an outer layer of Ag or a coating of an inner layer of Cr and an outer layer of NiCr. These two-layer coated CBN compacts were evaluated for brazability and adhesion.

SUMMARY OF THE INVENTION

According to a first aspect to the present invention there is provided coated boron or nitrogen containing superhard abrasive material selected from cBN, boron suboxide and boron carbide comprising:
a cBN, boron suboxide and/or boron carbide superhard abrasive material substrate;
a primary layer of a carbide/nitride/boride forming metal, such metal preferably being substantially in the form of a carbide, nitride or boride;
a secondary layer of a high melting point metal selected from W, Mo, Cr, Ni, Ta, Au, Pt, Pd and alloys thereof; and
an overcoat of Ag, Ni, Cu, Au, Pd, Pt, Rh, Os, Ir, Re, combinations and alloys thereof such as bronze (Cu/Sn), silver/bronze and silver/tin, the metal of the secondary layer being different to the metal of the overcoat.

The term "superhard" means having Vickers hardness greater than about 25 GPa, preferably greater than about 30 GPa.

cBN is the most preferable material, although a Ti coating is expected to form bonds with the C of boron carbide and the B of all the abovementioned materials (TiB2).

The development of synthetic ultrahard materials which have hardness values approaching or even exceeding that of diamond has been of great interest to material scientists. With a Vickers hardness of between 70 to 100 GPa, diamond is the hardest material known, followed by cubic boron nitride (NV~60 GPa) and boron suboxide (HV~38 GPa), herein referred to as B6O. Hardness values of 53 GPa and 45 GPa have been determined at 0.49N and 0.98N load respectively for B6O single crystals, which are similar to those of cubic boron nitride.

The term "boron suboxide" includes all forms of the material as hereinafter set out. It is known that B6O may also be non-stoichiometric i.e. exist as $B_6O_{1-x}$ (where x is in the range 0 to 0.3). Such non-stoichiometric forms are included in the term B6O. The strong covalent bonds and short interatomic bond length of these materials contribute to the exceptional physical and chemical properties such as great hardness, low mass density, high thermal conductivity, high chemical inertness and excellent wear resistance [1, 2]. In U.S. Pat. No. 5,330,937 to Ellison-Hayashi et al., the formation of boron suboxide powders of nominal composition B3O, B4O, B6O, B7O, B8O, B12O, B15O and B18O was reported. Potential industrial applications have been discussed by Kurisuchiyan et al (Japan Patent No. 7,034,063) and Ellison-Hayashi et al (U.S. Pat. No. 5,456,735) and include use in grinding wheels, abrasives and cutting tools. The carbide/nitride/boride forming metal may be selected from Ti, Cr and Mo. The metal is preferably Ti.

The coated superhard abrasive material may be in the form of (i) coated cBN grit in the size ranges from 0.01 um to 20 mm (ii) coated Polycrystalline Boron Nitride (PCBN) blanks (iii) cBN compacts and (iv) agglomerates of cBN, which allows cBN to be used when brazing cBN tools in an oxidising environment. This coated cBN material eliminates the need for vacuum furnaces when producing sintered segments containing liquid phase infiltrants such as bronzes or when fixing cBN material to another metallic or cermet material by such methods as brazing.

In accordance with a preferred embodiment of this aspect to the present invention, the primary carbided layer or coating is applied by sol-gel, CVD or PVD (Physical Vapour Deposition). The secondary layer, e.g. W, may be applied by PVD or low temperature CVD or electroplating. The overcoat of Ag, Ni, Cu, Au, Pd or Pt is preferably applied by PVD, CVD, electrolytic or electroless plating.

In accordance with another embodiment of this aspect of the present invention cBN with a low thermal stability can be coated by cold temperature coating processes such as sol-gel, PVD or low temperature CVD, thereby minimising any strength reduction which a high temperature coating process may cause to the cBN substrate. In the case of cBN with high thermal stability, a combination of hot and cold processes can be utilised. Hot processes are preferred in order to create a chemical bond between the cBN and the coating, thereby improving retention of the cBN in or on a metal.

According to a second aspect to the present invention there is provided use of coated boron or nitrogen containing superhard abrasive material selected from cBN, boron suboxide and/or boron carbide in abrasive tools to improve performance. The methods used to produce such tools may include hot pressing, free sintering, infiltration sintering and particularly brazing.

in a preferred embodiment of this aspect of the present invention, a coated PCBN blank can be used in abrasive tools to improve performance. The coating allows PCBN blanks to be attached to a tool by brazing the blank to the tool in an oxidising environment.

According to a third aspect to the present invention there is provided an air brazable article produced by applying a non-oxidising protective coat directly onto the surface of coated boron or nitrogen containing superhard abrasive material selected from cBN, boron suboxide and/or boron carbide, thereby simplifying the coating process, and reducing coating costs.

In accordance with this aspect of the present invention, an air brazable article can be produced by applying the non-oxidising protective coat onto the Ti, TiC, TiN, TiB, TiBN or TiCN primary surface of the cBN, thereby the improving the protective coating adhesion to the cBN particle as compared to applying the non-oxidising protective coat directly onto the surface of the cBN.

According to a fourth aspect to the present invention there is provided a method of producing coated boron or nitrogen containing superhard abrasive material selected from cBN, boron suboxide and/or boron carbide, the method including the steps of:

providing a cBN, boron suboxide and/or boron carbide substrate;
coating the substrate with a primary layer of a carbide/nitride/boride forming metal, preferably substantially as the carbide, nitride or boride;
coating the primary layer with a secondary layer of a high melting point metal selected from W, Mo, Cr, Ni Ta, Au, Pt, Pd and alloys thereof; and
coating the secondary layer with an overcoat of Ag Ni, Cu, Au, Pd, Pt, Rh, Os, Ir, Re, combinations/alloys thereof or alloys thereof, the metal of the secondary layer being different to the metal of the overcoat.

In a preferred embodiment of the present invention, the primary coating (layer) is applied by either CVD or PVD, the secondary, for example, W coating is applied by PVD or CVD, thus eliminating the need for a heat treatment once coated. The overcoat may be applied by PVD or electrolytic or electroless deposition.

According to a fifth aspect to the present invention there is provided an abrasive-containing tool including coated boron or nitrogen containing superhard abrasive material selected from cBN, boron suboxide and/or boron carbide according to the present invention.

In a preferred embodiment of this aspect to the invention, the abrasive containing tool is selected from segments for saw blades, saw blades per se, drills, beads for diamond wires, band saw blades, hacksaws, core drill bits, wire beads, twist drills, wear parts, grinding wheels, grinding tips, rotary dressers, dresser logs for single and multiple log dressers, profile dressers, straight and profiled routers, polishing cups, single point tools, calibration rollers, wire drawing dies, single point turning tools, gauge materials, hard facing, surface grinders or any sintered segment containing coated superabrasives.

According to a sixth aspect of the present invention there is provided the use of coated boron or nitrogen containing superhard abrasive material selected from cBN, boron suboxide and/or boron carbide according to the present invention in an oxidative brazing process, in non-oxidising environments including under vacuum and/or in a reducing environment.

In this specification, the terms layer and coating are used interchangeably.

PREFERRED EMBODIMENTS

In accordance with the present invention there is provided coated boron or nitrogen containing superhard abrasive material selected from cBN, boron suboxide and/or boron carbide (grit) preferably in the size ranges from 0.01 um to 20 mm (starting grit, although it will be appreciated by those skilled in the art that there is a negligible difference between starting and finished grit) which allows the grit to be used when manufacturing tools in an oxidising environment. The coated material preferably consists of a cBN grit substrate, a primary layer of TiN, a secondary layer of W and an overcoat of Ag.

WO2005078041 (Egan et al. E6, 2005) describes a coating with a primary layer of TiN and a secondary layer of W on cBN grit sizes from 0.1 um to 10 mm. The product of the present invention preferably includes an outer oxidation resistant overcoat of Ag, Ni, Cu, Au, Pd, Pt or alloy thereof on the dual layer product described in WO2005078041 (Egan et al. E6, 2005). The protective overcoat prevents oxidation of the W and is preferably Ag. Although the protective overcoat can be applied directly onto the cBN surface or to the Ti, TiN, TiB, TiBN or TiCN layer, it is preferable to have a primary layer of Ti, TiN, TiB, TiBN or TiCN and a secondary layer of W in order to provide the same benefits as that described in WO2005078041 (Egan et al. E6, 2005). Specifically, the TiN and W combination of coatings is useful where the TiN coating would be reacted away by a constituent of the matrix material during sintering. An example of this would be the use of a liquid infiltrant such as bronze. In addition, the TiN and W combination is useful where the titanium based coating would be reacted away by brazes used to fix a superabrasive component to another metallic or ceramic material.

The tungsten layer does not have a carbide inner portion, which is not necessary as the purpose of the outer layer is primarily as a barrier for protecting the inner layer and substrate, and sufficient interlayer bonding can be achieved by keeping the tungsten coating relatively thin. The tungsten coating has a thickness of about 0.01 µm to about 50 µm, in particular about 0.2 µm to about 1 µm.

The TIN and W combination is especially useful in the making of cBN impregnated tools where high amounts of bronze or copper limit the usefulness of TIN coatings, the making of brazed cBN layer tools and the making of cBN containing metal matrix composites.

The additional oxidation resistant overcoat of, for example, Ag on the dual coated TIN plus W product allows for all the above advantages, but with the additional benefit of allowing any such tools to be produced in air, thereby easing manufacturability and reducing costs.

The cBN grit particles are those used conventionally in the manufacturing of metal bonded tools. They are generally uniformly sized, typically 0.01 um to 20 mm. Examples of such cBN grit particles include: Micron grit 0.01 to 60 micron, wheel grit 40 um (micrometers) to 200 um, saw grit 180 um to 2 mm, and larger crystals up to 20 mm in either length or diameter.

The primary layer of Ti, TiC TiN, TiB, TiBN or TiCN can be applied by either a hot coating process such as CVD, or by a low temperature coating process such as PVD or low temperature CVD.

In the hot coating process, the metal-based coat is applied to the cBN substrate under suitable hot conditions for such bonding to take place. Typically, a range for a hot process would be between 650° C. and 1300° C. Typical hot coating technologies that can be used include processes involving deposition from a metal halide gas phase, CVD processes or thermodiffusion vacuum coating or metal vapour deposition processes. Deposition from a metal halide gas phase and CVD processes are preferred.

In processes involving deposition from a metal halide gas phase, the particles to be coated are exposed to a metal-halide for example, titanium chloride, titanium iodide and titanium boride, containing the metal to be coated (e.g. Ti) in an appropriate gaseous environment (e.g. non-oxidising environments containing one or more of the following: an inert gas selected from helium and argon, hydrogen, a hydrocarbon, cracked ammonium or any combination, for example, argon/hydrogen mixture, at a positive pressure, atmospheric pressure or reduced pressure, for example, $10^{-1}$ to $10^{-7}$ mBar). The metal halide may be generated from a metal as part of the process.

The mixture is subjected to a heat cycle for example, 650° C. to 1300° C., for 5 min to 10 hrs, 1 to 10 cycles during which the metal-halide transports the Ti to the surfaces of the particles where it is released and is chemically bonded to the particles.

The primary layer can also be deposited using a cold coating technique such as low temperature CVD processes or PVD, the fatter being preferred. Both are low temperature processes in that insufficient heat is generated to cause significant nitride formation with the cBN. An example of a PVD process for applying the outer coating is sputter coating. In the case of a Ti coating, a flux of metal vapour is produced by an excitation source such as a magnetron. Articles such as cBN grit or PCBN blanks which are placed in the flux become coated with Ti metal. In the case of TiC, TiN or TiCN, these coatings can be deposited by reactive sputtering. Reactive sputtering is performed by introducing a carbon or nitrogen containing gas which reacts with the metal flux to form either a carbide or nitride. Carbon can be sourced form gases such as methane or butane while Nitrogen can be sourced from $N_2$. It can also be understood that a TiCN can be produced by introducing both gases simultaneously. Reactive sputtering can also be used to grade the coatings from say Ti to TiN by systematically increasing the amount of reactive gas in the PVD reaction chamber.

Low temperature coating processes are preferable but not limited to instances where the cBN substrate has a low thermally stability. Low temperature coating processes will minimise any strength reduction which a high temperature coating process may cause to the cBN substrate. In the case of cBN with high thermal stability a combination of hot and cold processes can be utilised. Hot processes are preferred in order to create a chemical bond with the substrate, thereby improving retention of the grit in the matrix resulting in improved performance.

The secondary layer of tungsten is deposited using a cold coating technique such as low temperature CVD or PVD, the latter being preferred. An example of a PVD process for applying the secondary coating is sputter coating. In this method, a flux of tungsten metal vapour is produced by an excitation source such as a magnetron. Articles such as superabrasive grit or a component placed in the flux become coated with tungsten metal. The secondary layer of tungsten can also be applied by a low temperature CVD process such as hydrogen reduction of tungsten hexafluoride gas. Typically, this is carried out a <700° C. but can be also be undertaken at temperatures up to 1300° C.

The overcoat of oxidation resistant protective coating, preferably Ag, can be applied by a cold technique such as PVD or by electrolytic or electroless plating. An example of a PVD process for applying the outer coating is sputter coating. In this method, a flux of silver metal vapour is produced by an excitation source such as a magnetron. Articles such as superabrasive grit or a component placed in the flux become coated with silver metal.

The overcoat of Ag can also be applied by electrolytic plating. In this method a quantity of the grit is placed in a plating barrel consisting of AgCN, KCN, free KCN, and brightener for example, Silversene-L (RTM). A silver electrode in the form of rectangular pieces of silver contained in a polypropylene bag, is also used (purity of the silver was 99.9%). The barrel is rotated at between 1 and 30 rpm, preferably 3 to 10 rpm and a current of 0.1 to 10 Amps, preferably 0.6 to 1.5 Amps is applied in order to plate the surface of the abrasive article with Ag. The duration and temperature of the process was 1 min to 3 weeks at between 1° C. and 100° C.

The overcoat of Ag can also be applied by electroless plating. An example of electroless plating is that following a modified version of that described in ZA8203067 [GE, Ruark & Webster, 1983] and U.S. Pat. No. 4,403,001 [GE, Grenier, 1983], both of which are incorporated herein by reference. This process can be adapted to coat cBN with silver by suspending the cBN grit in an ammoniacal silver solution, preferably by physical agitation thereof, followed by the slow addition of a reducing solution, for example invert sugar (mixture of table sugar and nitric acid) there to while maintaining the agitation and cBN suspension in the silver solution. The metered rate of addition of the reducing solution is carried on until the silver has been coated onto the individual grit and such process repeated until the desired coating weight (or thickness) has been attained. The above process can also be used to coat PCBN blanks.

As the particle diameter decreases the cost of plating by PVD increases substantially. Therefore, from a cost perspective, the preferred method as the particle diameter decrease is to apply the silver coating by electroless, electrolytic deposition or a combination of electroless/electrolytic deposition.

As such, the preferred range thickness of the primary layer is 0.01 um to 50 um, preferably 0.3 to 1.2 um.

The preferred range thickness of the secondary layer is 0.01 um to 50 um, preferably 0.3 to 3 um.

The preferred range thickness of the overcoat (for example, Ag) is 0.01 um to 50 um, preferably 0.3 to 3 um.

The preferred range size of the substrate is:
On grits: 0.01 um to 10 mm;
On PCBN: 0.5 mm in diameter to 1000 mm or from 0.5 mm in length to 1000 mm Preferably the secondary layer does not chemically bond to the primary layer, although it will be appreciated that during tool manufacture some bonding may occur.

Preferably the overcoat, for example Ag, does not chemically bond to the secondary layer although it will be appreciated that during tool manufacture some bonding may occur.

In each case of coating, preferably the entire substrate is covered but there is always the possibility that there may be gaps in the coating.

The coated cBN abrasive material (grit) produced according to the present invention is primarily intended for single layer tools or as an alternative to electroplating.

However, in order to highlight the diverse potential of this coating, a non exhaustive list of potential applications is provided below:

Saw blades, band saw blades, hacksaws, core drill bits, wire beads, twist drills, wear parts, grinding wheels, grinding tips, rotary dressers, dresser logs for single and multiple log dressers, profile dressers, straight and profiled routers, polishing cups, single point tools, calibration rollers, wire drawing dies, single point turning tools, gauge materials, hard facing, surface grinders or any sintered/brazed segment containing coated superabrasives, concrete or stone floor grinding or polishing.

In addition, as the coating can also be applied to stoichiometric cBN grit, non-stoichiometric cBN grit, oxygen rich cBN grit, Polycrystalline Boron Nitride (PCBN) blanks, cBN compacts and agglomerates of cBN. This coating can also be used in those application areas.

One of the advantages of the coating according to the present invention is that it allows for tools to be manufactured by air brazing and in particular to make single layer tools by brazing superabrasives in non-inert atmospheres. This opens up a number of opportunities for novel methods to produce such tools. Techniques which can be used to braze the coated superabrasive article to a tool substrate include: induction heating, standard brazing, blow torching and heating using an acetylene torch.

The coated abrasive material according to the present invention may also provide some benefits in other tool making technologies such as hot pressing, free sintering and infiltration sintering. For example, as the coating builds on existing technology such as that described in IE S2004/0024, the coating may offer advantages such as improved wetting, increased retention and/or improved protection when used to producing tool segments by infiltration sintering where liquid phases are typically present.

Other examples of tool manufacturing technologies include but are not limited to electro discharge sintering (EDS), field assisted sintering technology (FAST) and laser sintering. In addition, the coating may open up a different tool manufacturing technology to that currently used to produce existing and new tools which may have an economical benefit to the tool maker.

The coating according to the present invention may potentially offer advantages when joining superabrasive blanks such as PCD, CVD diamond, and PCBN to substrates.

The invention will now be described with reference to the following non-limiting examples.

EXAMPLE 1

On Element 6 ABN800 50/60 US Mesh grit three coated products were produced: (1) 0.5 um Ti coating applied by PVD, (2) 0.5 um TiN coating applied by CVD and (3) a coating consisting of a primary layer of TiN by CVD and secondary layer of W by PVD (0.4 um thick).

The coated cBN grit was mixed with braze paste and placed on a tungsten carbide coupon. The coated cBN grit, braze and coupon were then heated with an induction coil until the braze paste was seen to melt and all the organics/solvents in the braze paste had been burnt off. Upon cooling the brazed coupon was examined. It was seen in all instances that the braze paste did not wet the surface of the coating Therefore, (1), (2) or (3) cannot be brazed in air as the surface of the coating oxidises and thus prevents wetting of the braze material. The above would be expected to result in poor retention of the cBN grit in the braze.

EXAMPLE 2

Using Sample (3) from Example 1, a layer of silver (0.5 um thick) was applied by PVD to produce samples no. (4). The brazing was performed as outlined in Example 1. In the case of (4), the coated cBN was wetted by the braze. Therefore, Samples (4) would be expected to have relatively good retention of the cBN in the braze.

EXAMPLE 3

On Element 6 ABN800 50/60 US Mesh grit the following coating was applied; a primary layer of Ti graded to TiC (0.5 um thick) deposited by reactive sputtering, a secondary layer of W deposited by low temperature CVD using hydrogen reduction of tungsten hexafluoride and a protective overcoat of Ag deposited by electrolytic plating using silver cyanide. Brazing of this coated product was performed as outlined in Example 1. The coated cBN was wetted by the braze. Therefore, this sample would be expected to have relatively good retention of the cBN in the braze.

EXAMPLE 4

On a PCBN blank, the following coating was applied: a primary layer of TiN (0.4 um) by low temperature CVD, a secondary layer of W (0.4 um) by PVD and a protective overcoat of Ag (0.5 um) by PVD.

A Wetability test was performed on the above coated PCBN blank and also on an uncoated blank. A braze paste was placed on both blanks which were then heated with an induction coil until the braze paste was seen to melt and all the organics/solvents had been burnt off. Upon cooling the brazed coupon was examined. It was seen in the case of the uncoated PCBN blank, the braze material did not wet the surface of the blank. However, in the case of the coated blank, wetting of the braze on the coating was observed.

EXAMPLE 5

A PCBN blank was coated as per Example 4. On top of a tungsten carbide substrate a layer of braze paste was applied.

The coated blank was then placed coated side down on top of the tungsten carbide blank. The assembly was then heated with an induction coil until the braze paste was seen to melt and all the organics/solvents had been burnt off. Upon cooling, it was observed that the PCBN blank was successfully brazed to the tungsten carbide substrate.

The invention claimed is:

1. A coated boron or nitrogen containing superhard abrasive material selected from cBN, boron suboxide and boron carbide comprising:
   a cBN, boron suboxide or boron carbide superhard abrasive material substrate;
   a primary layer of a carbide/nitride/boride forming metal that is substantially in the form of a carbide, nitride or boride;
   a secondary layer of a high melting point metal selected from W, Mo, Cr, Ni, Ta, Au, Pt, Pd and alloys thereof; and
   an overcoat of Ag, Ni, Cu, Au, Pd, Pt, Rh, Os, Ir, Re, combinations and alloys thereof, the metal of the secondary layer being different to the metal of the overcoat.

2. A coated material according to claim 1 wherein the superhard material has a Vickers hardness greater than about 25 GPa.

3. A coated material according to claim 1 wherein the superhard material is cBN.

4. A coated material according to claim 1 wherein the carbide/nitride/boride forming metal is selected from Ti, Cr and Mo.

5. A coated material according to claim 4 wherein the metal is Ti.

6. A coated material according to claim 1 wherein the metal of the primary layer is substantially in the form of the carbide, nitride or boride.

7. A coated material according to claim 1 wherein the metal of the secondary layer is tungsten and the overcoat is silver.

8. A coated material according to claim 1 wherein the coated superhard abrasive material is in the form of:
   coated cBN grit in the size ranges from 0.01 um to 20 mm;
   coated Polycrystalline Boron Nitride (PCBN) blanks;
   cBN compacts; and/or agglomerates of cBN.

9. Use of coated boron or nitrogen containing superhard abrasive material selected from cBN, boron suboxide and/or boron carbide according to claim 1 in abrasive tools to improve performance.

10. Use as claimed in claim 9 wherein the coated abrasive material is a coated PCBN blank.

11. A method of producing coated boron or nitrogen containing superhard abrasive material selected from cBN, boron suboxide and/or boron carbide, the method including the steps of:
    providing a cBN, boron suboxide or boron carbide substrate;
    coating the substrate with a primary layer of a carbide/nitride/boride forming metal;
    coating the primary layer with a secondary layer of a high melting point metal selected from W, Mo, Cr, Ni Ta, Au, Pt, Pd and alloys thereof; and
    coating the secondary layer with an overcoat of Ag Ni, Cu, Au, Pd, Pt, Rh, Os, Ir, Re, combinations or alloys thereof, the metal of the secondary layer being different to the metal of the overcoat.

12. A method according to claim 11 wherein the primary layer is applied by CVD or PVD and the secondary coating is applied by PVD or CVD.

13. A method according to claim 11 wherein the overcoat is applied by PVD or electrolytic or electroless deposition.

14. A method according to claim 11 wherein the metal of the primary layer is substantially in the form of the carbide, nitride or boride.

15. An abrasive-containing tool including coated boron or nitrogen containing superhard abrasive material selected from cBN, boron suboxide and/or boron carbide according to claim 1.

16. An abrasive-containing tool according to claim 15 wherein the tool is selected from segments for saw blades, saw blades per se, drills, beads for diamond wires, band saw blades, hacksaws, core drill bits, wire beads, twist drills, wear parts, grinding wheels, grinding tips, rotary dressers, dresser logs for single and multiple log dressers, profile dressers, straight and profiled routers, polishing cups, single point tools, calibration rollers, wire drawing dies, single point turning tools, gauge materials, hard facing, surface grinders and any sintered segment containing coated superabrasives.

17. Use of coated boron or nitrogen containing superhard abrasive material selected from cBN, boron suboxide and/or boron carbide according to claim 1 in an oxidative brazing process, in non-oxidising environments including under vacuum and/or in a reducing environment.

* * * * *